Sept. 8, 1942.  T. E. HYNEK  2,294,986
FLAG HOLDER
Filed Oct. 6, 1941
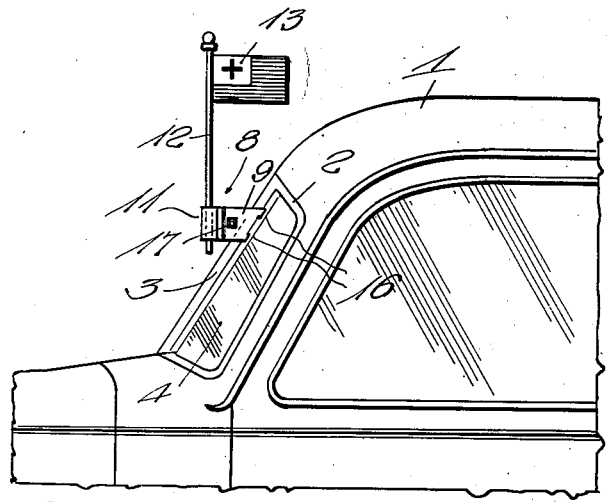
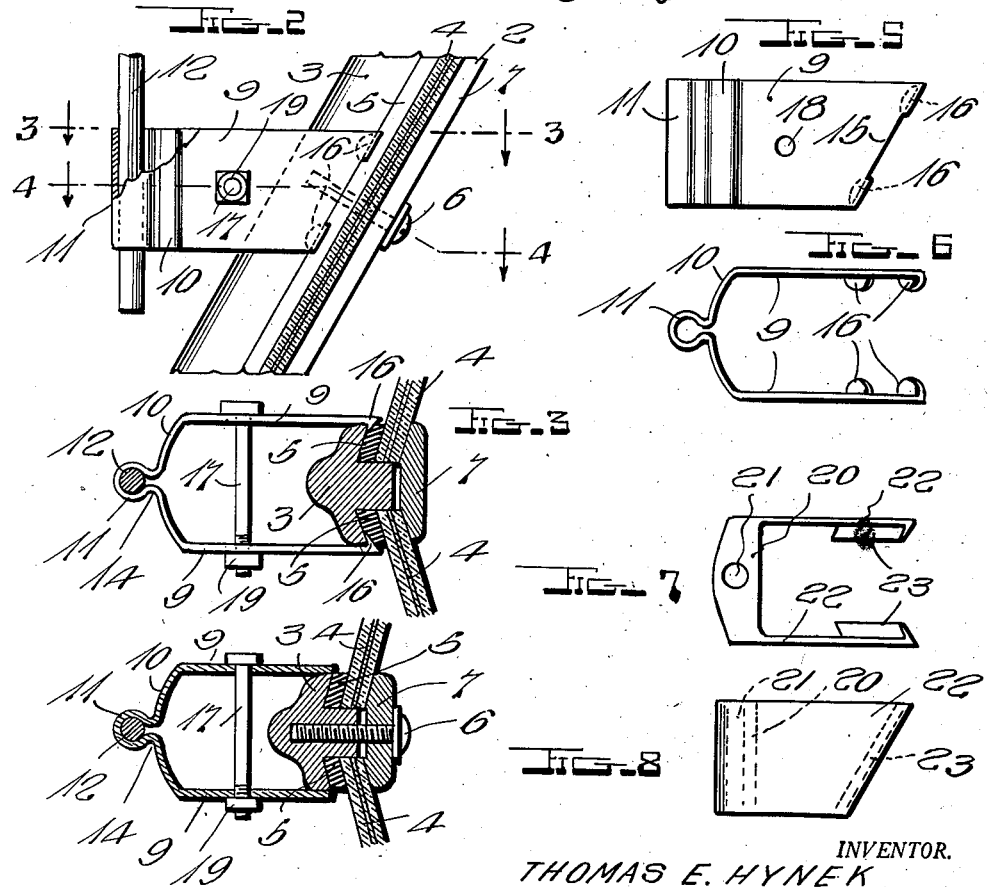
INVENTOR.
THOMAS E. HYNEK,
BY
ATTORNEY Patented Sept. 8, 1942

2,294,986

UNITED STATES PATENT OFFICE 2,294,986

FLAG HOLDER

Thomas E. Hynek, Chico, Calif.

Application October 6, 1941, Serial No. 413,901

3 Claims. (Cl. 248—41)

This invention relates to flag holders designed for application to the windshields of automobiles to support a flag as a decoration.

One object of the invention is to provide a flag holder adapted to be applied to a partition between windshield glasses and support a flag in upright position at the front of the automobile where it may be readily seen and be attractive in appearance.

Another object of the invention is to so form the holder that it may be detachably but firmly applied to the windshield partition in such position that, while it will support a flag upright at the front of the automobile, it will not constitute an obstruction and interfere with a clear view of the road ahead by the drive of the automobile.

Another object of the invention is to provide a flag holder so formed that it may be applied to the windshield partition and firmly grip the same without scratching or otherwise marring the surface of the partition.

Another object of the invention is to provide a flag holder of this character which is simple in construction, inexpensive to manufacture, and very efficient in use.

In the accompanying drawing:

Fig. 1 is a view showing a flag holder of the improved construction applied to the windshield of an automobile.

Fig. 2 is a view on an enlarged scale showing the flag holder applied to the partition of a windshield, the flag holder being principally in side elevation and partially in vertical section.

Fig. 3 is a view on the line 3—3 of Fig. 2.

Fig. 4 is a sectional view on the line 4—4 of Fig. 2.

Fig. 5 is a side elevation of the flag holder with the adjusting bolt removed.

Fig. 6 is a top plan view of the flag holder with the bolt removed.

Fig. 7 is a top plan view of a flag holder of modified construction.

Fig. 8 is a side elevation of the flag holder shown in Fig. 7.

The automobile 1, to which the flag holder has been shown applied, is of conventional construction and has a windshield 2 provided with the usual center partition 3 between its glasses 4. Packing 6 is provided between the glasses and the center bar and, when the screws 6 which hold the retainer strip 7 in place, are tightened, the packing is compressed to form a seal along margins of the glasses. This merely illustrates one form of center partition to which the improved flag holder may be applied.

The improved flag holder 8 is formed of resilient metal and has side arms 9 connected by a bridge 10. The bridge is curved between the side arms, and the bridge-portion of the blank from which the holder is formed, is crimped to form a forwardly projecting socket 11 to snugly receive and grip in a frictional manner the staff 12 of a flag 13. Since the throat 14 of the socket is open along its inner side, the socket may be expanded as the flag staff is thrust therein and then contract and firmly grip the staff to hold it and prevent the staff from slipping downwardly through the socket, the arms 9 of the socket have diagonally cut rear end edges 15 conforming to the incline of the center bar or partition 3 of the windshield, and, at these edges, the arms are provided with inwardly extending tongues or spurs 16 which engage side edges of the center bar 3 and the packing strips 5, as shown clearly in Figs. 2 and 3. Resiliency of the arms will tend to hold them in contact with side edges of the center bar and, in order to firmly hold them in gripping engagement with the center bar and maintain the tongues embedded between the packing and the center bar, there has been provided a bolt 17 which passes through openings 18 formed in the side arms of the flag holder. When the nut 19 of this bolt is tightened, the arms of the holder are forced toward each other and held in firm gripping engagement with opposite side edges of the center bar 3 and, since the tongues 16 are forced tightly into place between the center bar and the packings, they will aid in holding the device in engagement with the bar and very effectively prevent it from slipping forwardly out of engagement with the bar.

Since the flag holder is of only slightly greater width than the center bar of the windshield, it will not obstruct the view of the driver of the automobile on which the holder is installed, and the flag staff will be completely concealed from the driver. Tightening of the bolt also serves to shift portions of the bridge at opposite sides of the socket 11 toward each other and constrict the socket so that it has tight gripping engagement with the flag staff. When the bolt is loosened, the flag holder or bracket may be easily removed or shifted along the center bar to adjusted positions.

Figs. 7 and 8 of the drawing illustrate a modified construction wherein the flag holder has a thick and solid bridge 20 formed with a vertically extending bore or socket 21 to receive a flag staff, the socket being of such diameter that the flag staff will be frictionally held in the socket. The arms 22 are formed integral with the bridge and the entire holder is of resilient metal, and, when applying it, the arms are sprung away from each other and the inwardly extending lips 23 engaged between the windshield packing and opposite side edge portions of the center bar. Resiliency of the arms is solely depended upon to hold them in engagement with opposite side edges of the center bar and, when the screws are tightened to force the strip 7 of the center bar toward the rear face of the center bar and compress the packing 5, the lips will be firmly held between the packing and the center bar.

Having thus described the invention, what is claimed is:

1. A flag holder comprising a bracket having a resilient bridge bent intermediate its ends to form a vertically extending expansible and contractible flag staff receiving socket open at its top and bottom, arms extending rearwardly from opposite ends of the bridge and at their free rear ends being provided with inwardly extending members for engaging under opposite side edge portions of a center bar of a windshield, and a bolt passing through said arms transversely of the bracket and when tightened serving to draw the arms to a gripping position.

2. A flag holder comprising a bracket formed from a strip of resilient material bent to provide a longitudinally bowed bridge and arms extending rearwardly from opposite ends of the bridge, the portion of the strip forming the bridge being bent to form a forwardly projecting vertically disposed expansible and contractible flag staff receiving socket open at its top and bottom and along one side, and a bolt extending through the arms transversely of the bracket and when tightened serving to draw the arms into position for clamping engagement with a support and flex the bridge rearwardly to constrict the socket for gripping a flag staff and supporting the flag staff in the socket.

3. A flag holder comprising a bracket formed from a strip of resilient metal bent to provide a bridge and arms extending rearwardly from opposite ends of the bridge, the portion of the strip forming the bridge being crimped to form a forwardly projecting socket open at its top and bottom and along its rear side, and a bolt passing through the arms transversely of the bracket and when tightened serving to draw the arms to a gripping position and constrict the socket along its open side for gripping a flag staff.

THOMAS E. HYNEK.